(12) United States Patent
Beh

(10) Patent No.: US 11,773,930 B2
(45) Date of Patent: Oct. 3, 2023

(54) CALIPER SPECIFIC DECORATIVE BRAKE CALIPER COVER SET

(71) Applicant: Thomas P. Beh, Corona del Mar, CA (US)

(72) Inventor: Thomas P. Beh, Corona del Mar, CA (US)

(*) Notice: Subject to any disclaimer, the term of this patent is extended or adjusted under 35 U.S.C. 154(b) by 0 days.

(21) Appl. No.: 17/332,740

(22) Filed: May 27, 2021

(65) Prior Publication Data

US 2021/0372494 A1    Dec. 2, 2021

Related U.S. Application Data

(60) Provisional application No. 63/033,124, filed on Jun. 1, 2020.

(51) Int. Cl.

| | |
|---|---|
| *F16D 65/12* | (2006.01) |
| *F16D 65/00* | (2006.01) |
| F16D 55/225 | (2006.01) |
| F16D 55/00 | (2006.01) |
| F16D 55/228 | (2006.01) |

(52) U.S. Cl.
CPC ........ *F16D 65/0081* (2013.01); *F16D 55/225* (2013.01); *F16D 55/228* (2013.01); *F16D 2055/0037* (2013.01)

(58) Field of Classification Search
CPC ........................ F16D 65/12; F16D 65/123–128
USPC .............. 188/18 A, 218 XL, 264 A, 264 AA
See application file for complete search history.

(56) References Cited

U.S. PATENT DOCUMENTS

| | | | |
|---|---|---|---|
| D942,907 S * | 2/2022 | Zhang | .......................... D12/180 |
| 2004/0074716 A1* | 4/2004 | Brumfield | ............... F16D 55/22 188/218 A |
| 2009/0321198 A1* | 12/2009 | Barland | ............. F16D 65/0031 188/264 A |
| 2013/0095278 A1 | 4/2013 | Collura | |
| 2013/0192936 A1 | 8/2013 | Scotti et al. | |
| 2018/0080512 A1 | 3/2018 | Barland | |
| 2019/0338815 A1 | 11/2019 | Park | |

OTHER PUBLICATIONS

International Search Report and Written Opinion for PCT/US2021/035167; dated Sep. 10, 2021.

* cited by examiner

*Primary Examiner* — Christopher P Schwartz
(74) *Attorney, Agent, or Firm* — STETINA BRUNDA GARRED AND BRUCKER; Mark B. Garred

(57) ABSTRACT

A vehicle caliper cover set includes a plurality of caliper covers. Each caliper cover includes an inner surface sized and configured to be complementary in shape to an outer surface of one of the plurality of calipers. Each caliper cover further includes an outer surface having a medial portion and a lateral portion positioned in opposed relation to the medial portion. The inner and outer surfaces define a thickness therebetween, with the thickness being between 0.015-0.150 inches. Each caliper cover additionally includes a multi-sided opening extending from the inner surface to the outer surface, with the multi-sided opening being positioned between the medial and lateral portions of the outer surface.

20 Claims, 15 Drawing Sheets

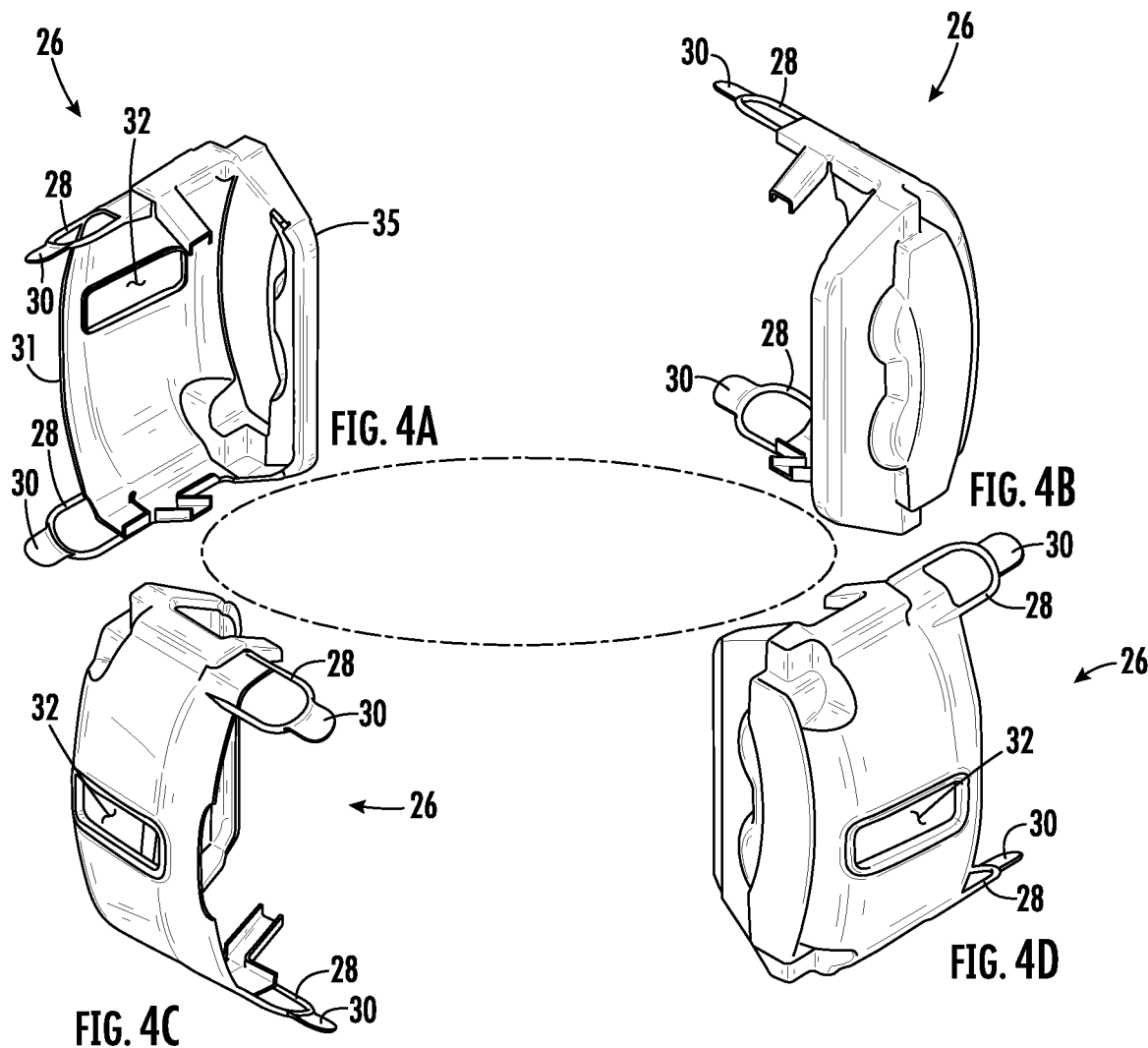

CALIPER SPECIFIC DECORATIVE BRAKE CALIPER COVER SET

CROSS-REFERENCE TO RELATED APPLICATIONS

The present application claims priority to U.S. Application Ser. No. 63/033,124 filed on Jun. 1, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to an automotive caliper cover set and more specifically to a vehicle/caliper specific decorative brake caliper cover set for enhancing the vehicle ownership experience by providing the appearance of a premium caliper disc brake system to a vehicle originally equipped with a base caliper disc brake system.

2. Description of the Related Art

Most vehicles utilize a disc brake system. Nearly all automobiles have disc brakes, front and rear, interfacing with and controlling the rotation of the wheels of the vehicle. Each disc (or rotor) of a disc brake system may rotate in unison with its respective wheel during travel. Disc brake system may require calipers that are fixed to the vehicle. Each caliper may control two internally positioned brake pads that interface with each spinning rotor during the process of braking or decelerating the vehicle. When the driver of the vehicle depresses the brake pedal, one or more hydraulically displaced pistons within each caliper may create friction by pushing each brake pad against each side of the rotor. The resultant friction affects vehicle movement; decelerating a moving vehicle or preventing acceleration of a non-moving vehicle. The friction created between the spinning rotor and the convergence of the fixed brake pads against each side of the rotor generates heat. As this heat is generated, it is transferred in two ways; via conduction to the interfacing components within the caliper and also via convection through the air passing through the wheel well.

Automotive manufacturers often offer different versions of their disc brake systems for a given vehicle make and model as a way of differentiating their base model from the premium or performance version. A base caliper disc brake system is less expensive than a premium or performance caliper disc brake system and, not surprisingly, carries less status among automotive enthusiasts. The caliper specification of the disc brake system is the most visible way of creating such differentiation. Disc brake systems can be comprised of either (a) fixed calipers, (b) floating calipers or (c) a combination of both.

Regarding the calipers of a vehicle disc brake system, calipers are specified by auto manufacturers and are specific to the particular vehicle model and any selected brake system options. The calipers of a vehicle are furnished and oriented as two pairs, front caliper pair and rear caliper pair.

For non-performance vehicles, floating (or sliding) calipers are more often specified. A floating caliper represents the base type of caliper and utilizes a single piston acting against the inside surface of the rotor from within a sliding caliper frame. Unlike the mono-block design of a fixed caliper, a floating caliper consists of both a static (nonmoving) caliper bracket and also a dynamic (moving) caliper frame. The caliper frame is mounted on the static caliper bracket which is mounted to the vehicle. When hydraulically pressurized via depression of the brake pedal, the displaced piston forces the inside brake pad against the inside of the rotor in one direction (outward), while causing the dynamic caliper frame to be pulled in the opposite direction (inward). This inward movement of the caliper frame simultaneously forces the outer brake pad against the opposing external surface of the rotor. The combination of these opposing movements (piston and caliper frame) results in the rotor being "squeezed" by the opposing brake pads. Given the multiple-component appearance resulting from the floating aspect of this type of lower performance caliper, it is generally considered to be less aesthetically appealing when compared to the single component appearance afforded by the mono-block design of the fixed caliper.

In summary, premium automotive brake system are typically comprised of fixed calipers. Further, the premium brake system takes on the performance identity when the calipers are painted and branded. Accordingly, automobiles outfitted with an upgraded performance OEM brake package will most often include: (a) fixed (mono-block) calipers, front and rear, that are (b) painted and (c) branded.

It can be appreciated that automotive caliper cover sets have been in use for years. Typically, automotive caliper cover sets are comprised of the aftermarket metal facade type caliper cover set and the aftermarket plastic facade type caliper cover set. Other options for improving the appearance of calipers includes the application of vinyl wrap sheets and the option of permanently modifying the calipers by painting them on an aftermarket basis.

A common problem with conventional automotive caliper cover sets is that, in the case of the metal facade type cover set and the plastic facade type caliper cover set, they are generic in style and do not closely follow the compelling industrial designs of a vehicle's calipers. Instead, these types of covers both merely block the line of sight to the caliper being shielded. The metal facade type caliper cover set requires metal fasteners for attaching to the vehicle's calipers and the plastic facade type caliper cover set requires the use of high temperature adhesive for direct attachment to the front facing surface of the vehicle's calipers. Although each is a reversible option allowing the vehicle to be returned to its stock condition, neither possesses the appearance of an OEM premium painted caliper given the "one-size-fits-all" approach employed by each option. Accordingly, neither option is effective in creating the appearance of a premium brake caliper system when installed on a vehicle equipped with a base caliper system. Upon installation, each fails to become integrated with the surface contours of the calipers they shield rendering them obvious as an unconvincing aftermarket add-on product.

Another problem with conventional automotive caliper cover sets is that, in the case of applying vinyl wrap sheets (or vinyl wraps) over a the calipers of a vehicle, this is an extremely challenging task given the varying contours of the caliper surface. The application of vinyl wraps works best for smooth and flat vehicle surfaces. Using this type of product on calipers is often unsuccessful given the limits to which the vinyl can stretch over the surface contours. Those who attempt using vinyl wraps over calipers often abort the effort or end up with poorly wrapped caliper surfaces that do not last. Even when a successful application of vinyl wraps is realized, it is only after many hours of effort that can be physically demanding on the installer. Another problem with conventional automotive caliper cover sets is that, in the case of the option of having the vehicle calipers painted on an aftermarket basis, this permanent solution eliminates any possibility of returning the vehicle to its unmodified (or stock) condition. In many instances, doing so can void the vehicle warranty and/or become a financial liability when attempting to resell the vehicle. Also, regarding the appearance of calipers painted on an aftermarket basis, it is important to remember that painting is an art form and painting installed calipers is a challenging task that relies exclusively on the skill of the painter. This is especially challenging given the environmental disadvantage associated with painting a caliper that is already installed on a vehicle and has been exposed to the environment. Conversely, the OEM caliper supplier paints new, clean calipers in a controlled environment using a repeatable process to affect high quality results. Accordingly, calipers that are painted on an aftermarket basis often fail to meet expectations.

While these devices may be suitable for the particular purpose to which they address, they are not as suitable for enhancing the vehicle ownership experience by providing the appearance of a premium caliper disc brake system to a vehicle originally equipped with a base caliper disc brake system. The present disclosure has been designed, as described herein, as an aftermarket product that can be both easily installed for use and also easily removed as might be needed for returning the vehicle to its unmodified (or stock) condition.

BRIEF SUMMARY

In view of the foregoing disadvantages inherent in the known types of automotive caliper cover sets and other caliper appearance changing methods now present in the prior art, the present disclosure provides a new vehicle/caliper-specific decorative brake caliper cover set construction wherein the same can be utilized for enhancing the vehicle ownership experience by providing the appearance of a premium caliper disc brake system to a vehicle originally equipped with a base caliper disc brake system. Various embodiments of the cover set described herein have been designed as an aftermarket product that can be both easily installed for use and also easily removed as might be needed for returning the vehicle to its unmodified (or stock) condition.

According to one embodiment, there is provided two types of caliper cover pairs, a pair of fixed caliper covers for fitment to a fixed caliper pair, and a pair of floating caliper covers for fitment to a floating caliper pair. Each cover comprising the automotive caliper cover set closely follows the contours of the vehicle-specific caliper for which it has been designed.

By accounting for both types of calipers in scope, the design concepts relating to the present disclosure may be capable of being applied to the caliper designs of any conceivable automotive disc brake system. Accordingly, an automotive caliper cover set including the pair of fixed caliper covers and a pair of floating caliper covers may be an aftermarket product that serves to enhance the vehicle ownership experience by providing the appearance of a premium brake caliper system to a vehicle originally equipped with a base caliper system. This may be achieved by: (a) replicating the appearance of the mono-block industrial design when installed on a floating caliper and highlighting it when installed on a fixed caliper, (b) replicating the performance upgrade color option when installed on a fixed or floating caliper and (c) replicating the branding feature of the OEM high performance mono-block caliper across the most visible surface when installed on a fixed or floating caliper.

Each cover may be molded from 80 A durometer silicone as a single component having a nominal wall thickness of 0.050 inch. The durometer may range from 60 A-100 A and the wall thickness may range from 0.015-0.150 inches.

The pair of fixed caliper covers may have symmetrical physical characteristics to facilitate manufacture thereof. Similarly, the pair of floating caliper covers may have symmetrical physical characteristics to facilitate manufacture thereof.

The caliper cover set may be sized and configured to facilitate installation as a set, by hand and without the need for tools.

The caliper cover set may be custom designed to fit the specific floating and/or fixed caliper designs associated with specific vehicle makes and models.

The caliper cover set may be sized and configured to improve the aesthetic appearance of the fixed and floating automotive brake calipers in both color and industrial design.

The caliper cover set may be sized and configured, with respect to the surface contours of the specific caliper to which each cover has been designed, to ensure direct contact with securing surfaces and surface contours having an appealing aesthetic while separating from surfaces which do not possess the preferred design aesthetic and those which require separation to allow for caliper movement.

The caliper cover set may be configured to withstand exposure to the operational environment of a vehicle disc brake system including automotive chemicals and extreme temperatures.

At least one cover in the caliper cover set may be formed of a material to facilitate both the flexibility required for ease of installation and the rigidity required to pre-load the design like a spring against specific surfaces, thus ensuring a precise fit while preventing separation from the caliper during use.

The caliper cover set may be sized and configured to adhere to critical surfaces of the caliper and mitigate the potential for interference with the proximate rotating wheel.

The caliper cover set may be an aftermarket product that can be both easily installed for use and also easily removed as might be needed for returning the vehicle to its unmodified (or stock) condition.

According to another embodiment, there is provided a vehicle caliper cover set for use with a caliper disc brake system on a vehicle including a pair of fixed calipers and a pair of floating calipers. The vehicle caliper cover set include a pair of fixed caliper covers. Each fixed caliper cover includes an inner surface sized and configured to be complementary in shape to an outer surface of one of the pair of fixed calipers. Each fixed caliper cover additionally includes an outer surface having a medial portion and a lateral portion positioned in opposed relation to the medial portion. The inner and outer surfaces define a thickness therebetween, with the thickness being between 0.015-0.150 inches. Each fixed caliper cover further comprises a quadrangular opening extending from the inner surface to the outer surface, the quadrangular opening being positioned between the medial and lateral portions of the outer surface. The vehicle caliper cover set additionally includes a pair of floating caliper covers, with each floating caliper cover including an inner surface sized and configured to be complementary in shape to an outer surface of one of the pair of floating calipers. Each floating caliper cover additionally includes an outer surface having a medial portion and a lateral portion positioned in opposed relation to the medial portion. The inner and outer surfaces define a thickness therebetween, with the thickness being between 0.015-0.150 inches. Each floating caliper cover additionally includes a pair of loops extending from the medial portion of the outer surface, with each of the pair of loops being extendable around a respective portion of one of the pair of floating calipers.

Each fixed caliper cover may include a hole sized to receive a bleeder screw on a respective one of the pair of fixed calipers.

The pair of fixed caliper covers and the pair of floating caliper covers may be fabricated from a material having a shore hardness in the range of 60 A-100 A.

Each of the pair of fixed caliper covers and each of the pair of floating caliper covers may be flexible and disposable in tension.

Each of the pair of fixed caliper covers and each of the pair of floating caliper covers are extendable between a neutral configuration and a flexed configuration, with each of the pair of fixed caliper covers and each of the pair of floating caliper covers being biased toward the neutral configuration.

Each of the pair of fixed caliper covers and each of the pair of floating caliper covers are formed of respective unitary bodies.

Each of the pair of floating caliper covers includes a main body and a pair of o-rings connected to the main body, the pair of o-rings defining the pair of loops.

According to another embodiment, the vehicle caliper cover set includes a pair of fixed caliper covers and a pair of floating caliper covers. Each fixed caliper cover includes an inner surface sized and configured to be complementary in shape to an outer surface of one of the pair of fixed calipers. Each fixed caliper cover also includes an outer surface having a medial portion and a lateral portion positioned in opposed relation to the medial portion. A quadrangular opening extends from the inner surface to the outer surface, with the quadrangular opening being positioned between the medial and lateral portions of the outer surface. Each fixed caliper cover additionally includes a hole sized to receive a bleeder screw on a respective one of the pair of fixed calipers.

According to a further embodiment, there is provided a vehicle caliper cover set comprising a plurality of caliper covers. Each caliper cover includes an inner surface sized and configured to be complementary in shape to an outer surface of one of the plurality of calipers. Each caliper cover further includes an outer surface having a medial portion and a lateral portion positioned in opposed relation to the medial portion. The inner and outer surfaces define a thickness therebetween, with the thickness being between 0.015-0.150 inches. Each caliper cover additionally includes a quadrangular opening extending from the inner surface to the outer surface, with the quadrangular opening being positioned between the medial and lateral portions of the outer surface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4A is a first side, rear upper perspective view of the floating caliper cover;

FIG. 4B is a second side, rear upper perspective view of the floating caliper cover;

FIG. 4C is a first side, front upper perspective view of the floating caliper cover;

FIG. 4D is a second side, front upper perspective view of the floating caliper cover;

Common reference numerals are used throughout the drawings and the detailed description to indicate the same elements.

DETAILED DESCRIPTION

Figure 1A:
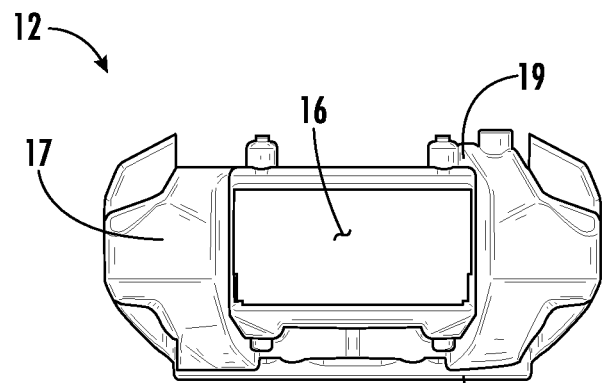
FIG. 1A is top view of a fixed caliper cover, driver side of front pair.
Figure 1F:
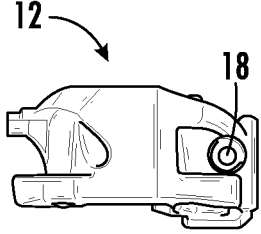
FIG. 1F is second side view of the fixed caliper cover of FIG. 1A.
Figure 1B:
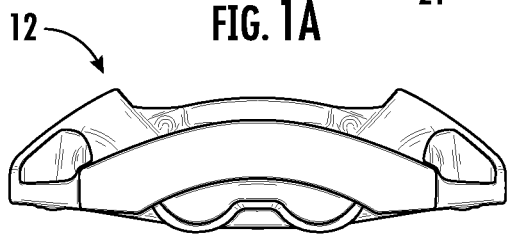
FIG. 1B is front view of the fixed caliper cover of FIG. 1A.
Figure 1E:
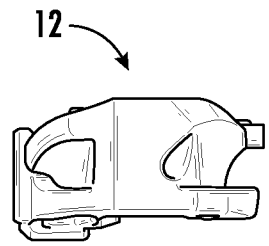
FIG. 1E is first side view of the fixed caliper cover of FIG. 1A.
Figure 1C:
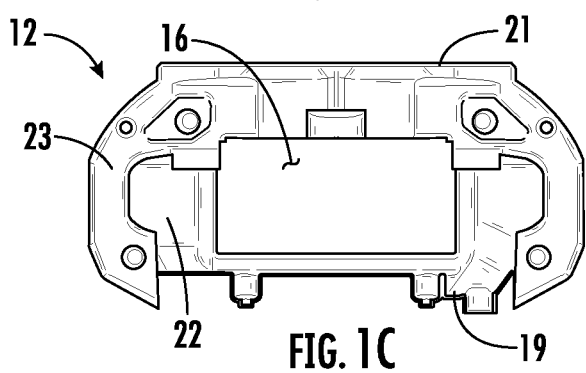
FIG. 1C is bottom view of the fixed caliper cover of FIG. 1A.
Figure 1D:
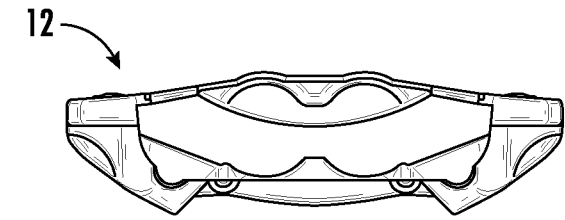
FIG. 1D is back view of the fixed caliper cover of FIG. 1A.

The detailed description set forth below in connection with the appended drawings is intended as a description of certain embodiments of a set of vehicle brake caliper covers and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, in which similar reference characters denote similar elements throughout the several views, the attached figures illustrate a vehicle/caliper specific decorative brake caliper cover set 10, which comprises two types of caliper cover pairs, one pair for fitment to a fixed caliper pair and one for fitment to a floating caliper pair. Each cover comprising the caliper cover set 10 may closely follow the contours of the vehicle-specific caliper for which it has been designed. Each cover may be molded from 80 A durometer silicone as a single component having a nominal wall thickness of 0.050 inch. Each cover is a preformed and contoured silicone membrane cover having a 0.050 inch nominal wall thickness.

It is understood that the values and dimensions provided herein are for example and not for purposes of limiting the scope of the present disclosure. In this regard, the hardness of the material used to form the cover set 10 may vary, such as a range of 60 A-100 A, and the nominal wall thickness may vary from 0.025-0.150 inches, without departing from the spirit and scope of the present disclosure.

A fixed caliper cover 12 is a 0.050 inch silicone membrane that may follow or mimic the exact contours of the outer surface of a fixed caliper 14 from which and for which it has been designed. In this regard, the fixed caliper cover 12 may be considered to be complementary in shape to the outer surface of the fixed caliper 14. The fixed caliper cover 12 may sized and configured to cover or extend over 100% of all visible surfaces of the fixed caliper 14 once installed thereon. The surfaces of the fixed caliper 14 which may not be covered by the installed fixed caliper cover 12 may be limited to one or more of the non-visible surfaces on the wheel-well-facing surface of the fixed caliper 14. By having a design that covers less than 100% of the non-visible surfaces, the fixed caliper cover 12 may be made easier to install while also allowing for more effective heat dissipation of the fixed caliper 14 via convection cooling during vehicle use/braking. The specified material (80A durometer silicone) and the caliper/vehicle-specific design of the fixed caliper cover 12 may combine to allow for a form fitted interface with the fixed caliper 14 of the vehicle. The flexibility of the selected material may allow the fixed caliper cover 12 to flex over the geometric surface contours of the fixed caliper 14 during installation, creating "die-lock" conditions over many of the fixed caliper surfaces securing the fixed caliper cover 12 into its fixed position during vehicle use. Fixed caliper surface sections lacking the contours that afford this "die-lock" condition for securing the fixed caliper cover 12 to the fixed caliper 14 may be designed to be preloaded against such surfaces (FIG. 1, 2) to mitigate separation during use.

Regarding material selection, the silicone material of the present disclosure possesses chemical and heat resistant characteristics so as to meet the environmental requirements of the fixed caliper cover 12. However, other materials known in the art capable of providing desired heat resistant characteristics, as well as meeting the environmental requirements may also be used.

Figures 2A, 2B, 2C, 2D:
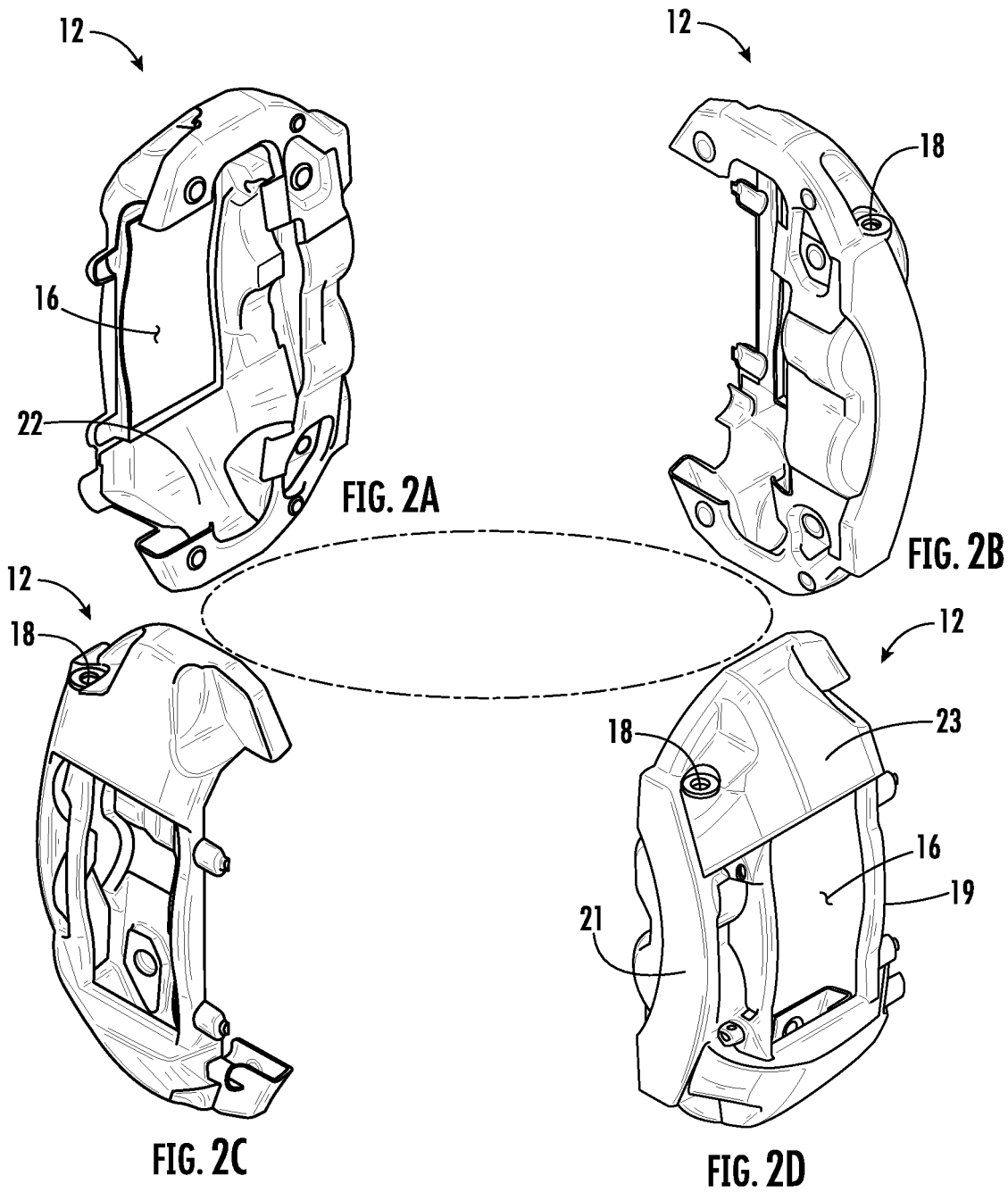
FIG. 2A is a first side, rear upper perspective view of the front caliper cover.
FIG. 2B is a second side, rear upper perspective view of the front caliper cover.
FIG. 2C is a first side, front upper perspective view of the front caliper cover.
FIG. 2D is a second side, front upper perspective view of the front caliper cover.
Figure 3A:
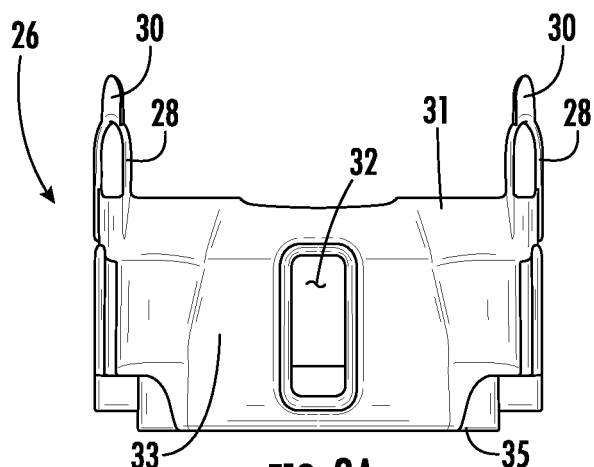
FIG. 3A is top view of a floating caliper cover.
Figure 3B:
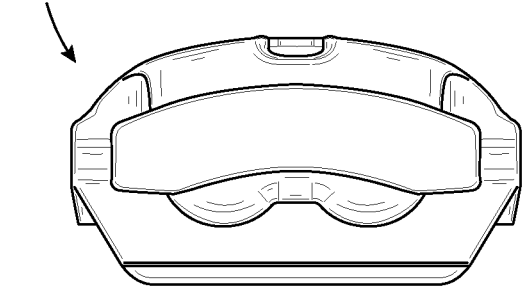
FIG. 3B is front view of the floating caliper cover of FIG. 3A.
Figure 3E:
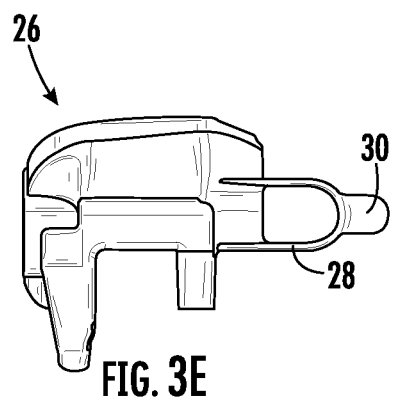
FIG. 3E is side view of the floating caliper cover of FIG. 3A.
Figure 3C:
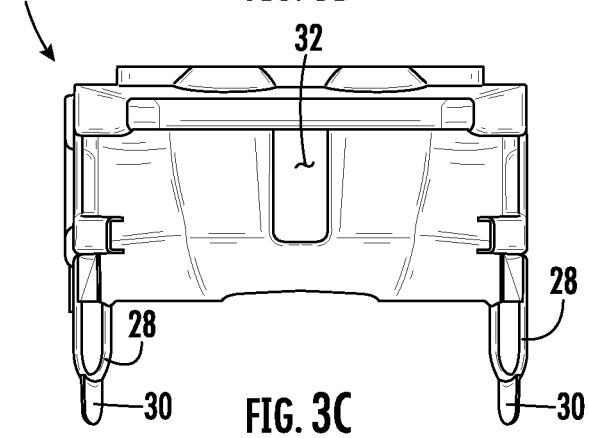
FIG. 3C is bottom view of the floating caliper cover of FIG. 3A.
Figure 3D:
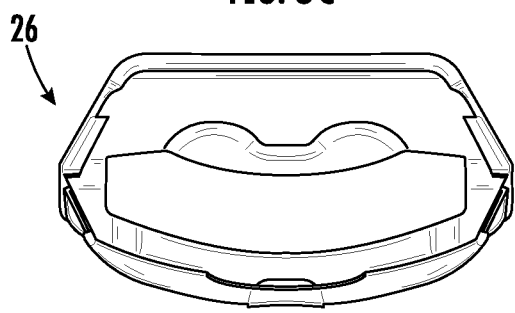
FIG. 3D is back view of the floating caliper cover of FIG. 3A.

The design of the fixed caliper cover 12 may incorporate one or more visible non-circular, multi-sided openings 16 (e.g., rectangular or quadrangular) across the top (or top portion) which may match or mimic that of the fixed caliper 14. The fixed caliper cover 12 may also include an outer surface 17 having a medial portion 19 and a lateral portion 21, and each opening 16 may be located between the medial portion 19 and a lateral portion 21 of an outer surface 17. Additionally, the fixed caliper cover 12 may incorporate a circular opening 18 which allows the one visible bleeder screw of the fixed caliper 14 to protrude through the installed fixed caliper cover 12. Each feature may be designed to enhance the authenticity of the present disclosure in its purpose of replicating the appearance of a factory-painted premium fixed caliper (FIG. 2).

Figure 5:
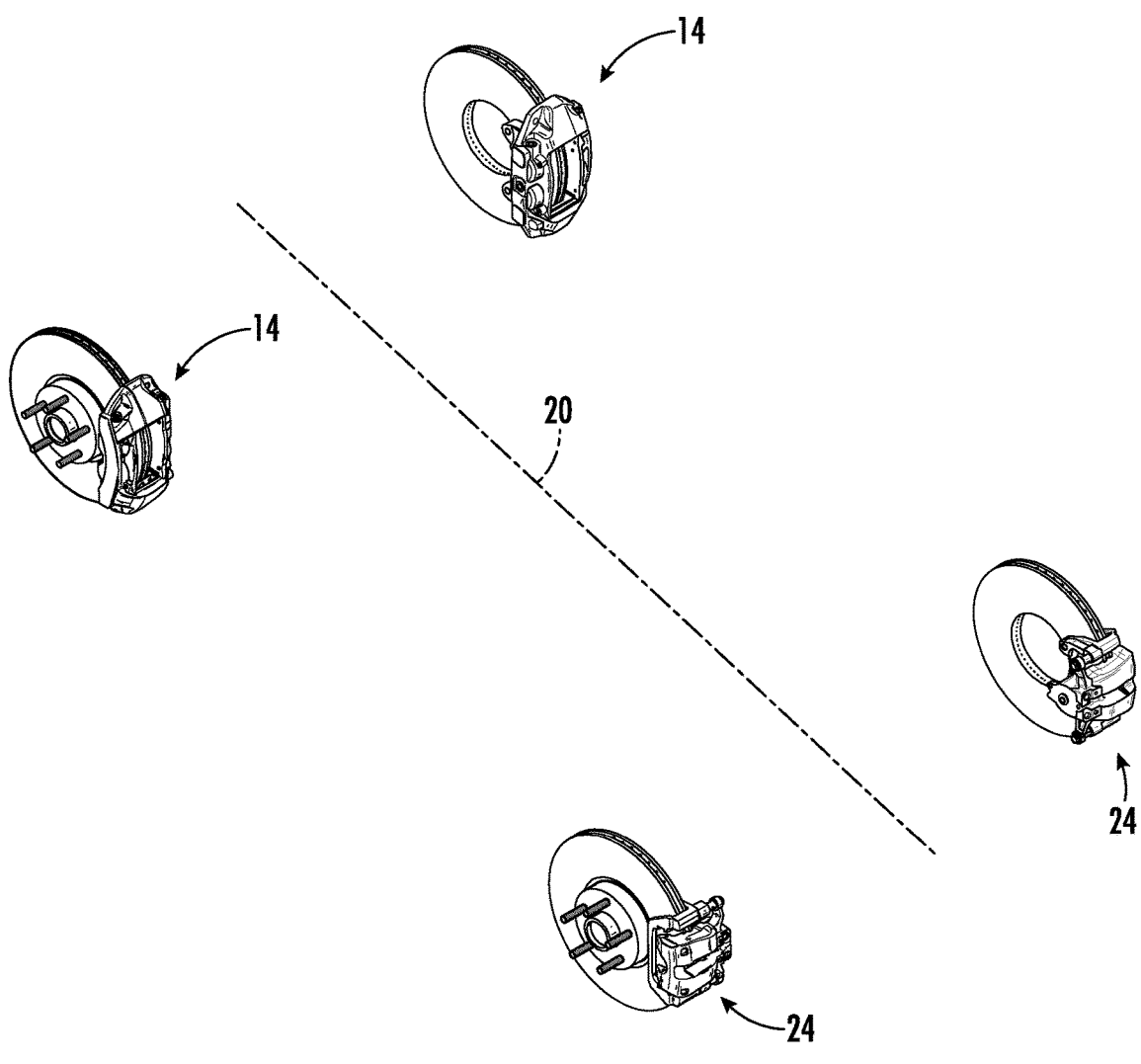
FIG. 5 is a perspective view of an automotive disc brake configuration (calipers over rotors)
Figure 6:
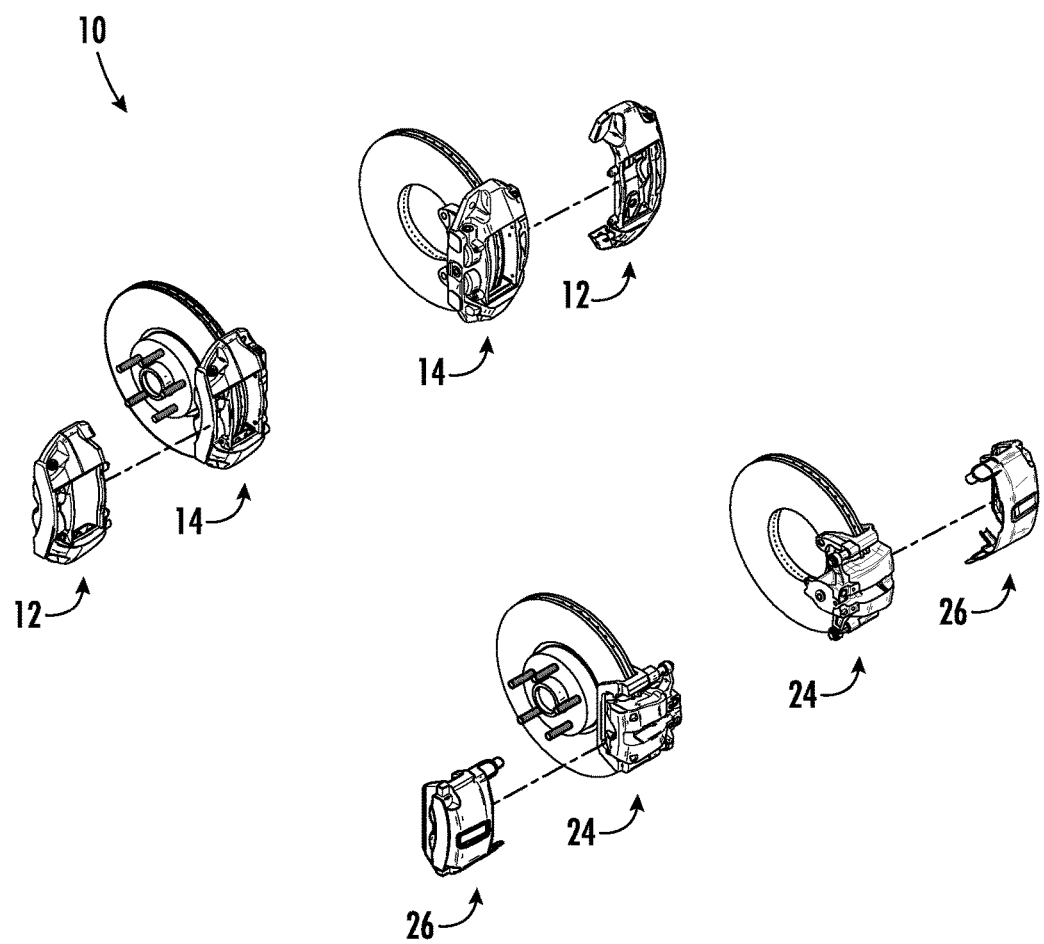
FIG. 6 is an exploded view an exemplary automotive caliper cover set with the automotive disc brake configuration.
Figure 7B:
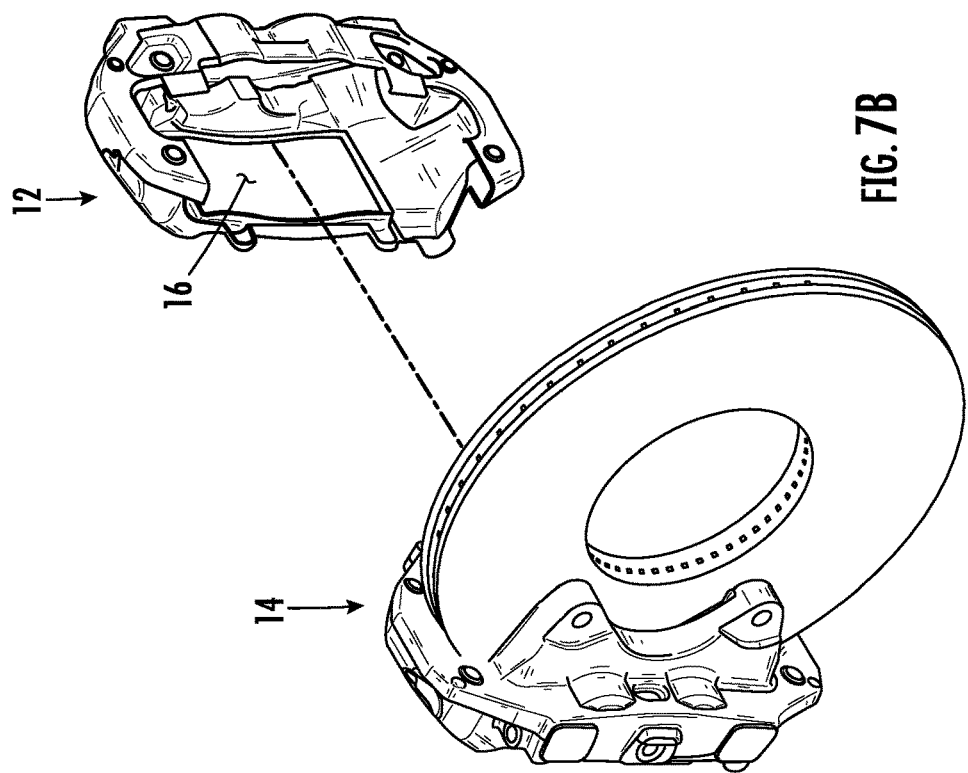
FIG. 7B is an exploded, rear upper perspective view of the fixed caliper cover with fixed caliper over rotor.
Figure 7A:
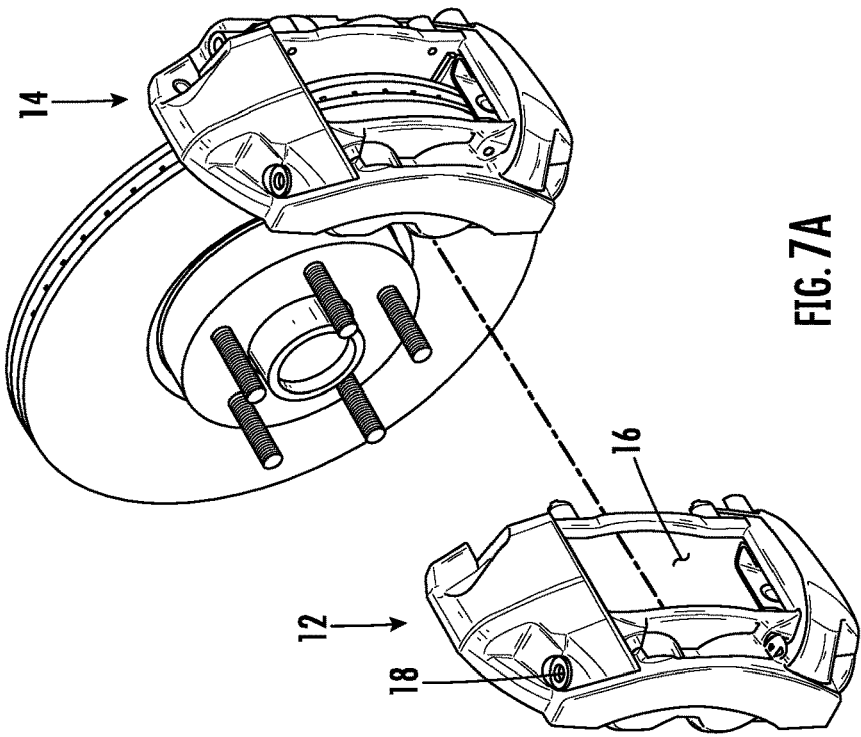
FIG. 7A is an exploded, front upper perspective view of the fixed caliper cover with fixed caliper over rotor.

The previously described fixed caliper cover 12 may represent a driver side front version for a U.S. configured vehicle having fixed calipers 14 on the front pair wherein the front fixed caliper pair is comprised of disparate versions for the driver side fixed caliper and the passenger side fixed caliper. Along these lines, although the driver side fixed caliper and passenger side fixed caliper may have minor differences, the same reference numeral (i.e., 14) has been used to refer to both the driver side fixed caliper and the passenger side fixed caliper. The difference between these two fixed calipers 14 is that although they are the mirror image of each other across a vertical plane 20 bisecting the vehicle along its length (FIG. 5), neither fixed caliper 14 may be symmetrical with respect to a plane bisecting its own length (FIG. 1). Symmetry of the caliper itself affords a simplified product in that it eliminates the need for two molds to produce the pair. A lack of symmetry, conversely, necessitates two individual tools (or molds) to manufacture a front pair of fixed caliper covers 12 (driver side and passenger side). As such, it may not be possible to produce a single fixed caliper cover 12 for fitment to both calipers 14 of the front pair unless surface contour adjustments are made during the design of the fixed caliper cover 12 to force the symmetry into the design; a symmetry that may be absent from the calipers 14 of the front pair.

Figure 12A:
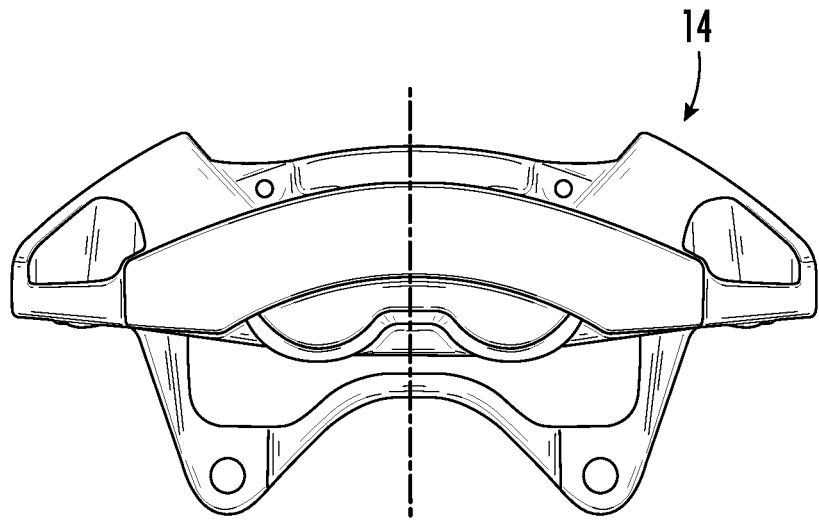
FIG. 12A is a front view of a driver's side asymmetrical fixed caliper cover.
Figure 12B:
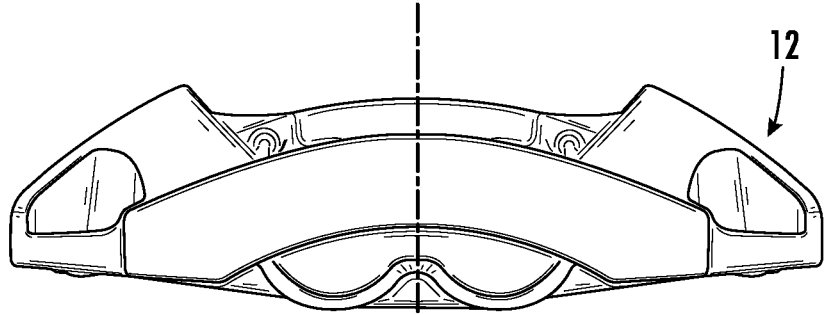
FIG. 12B is front view of a symmetrical fixed caliper cover
Figure 12C:
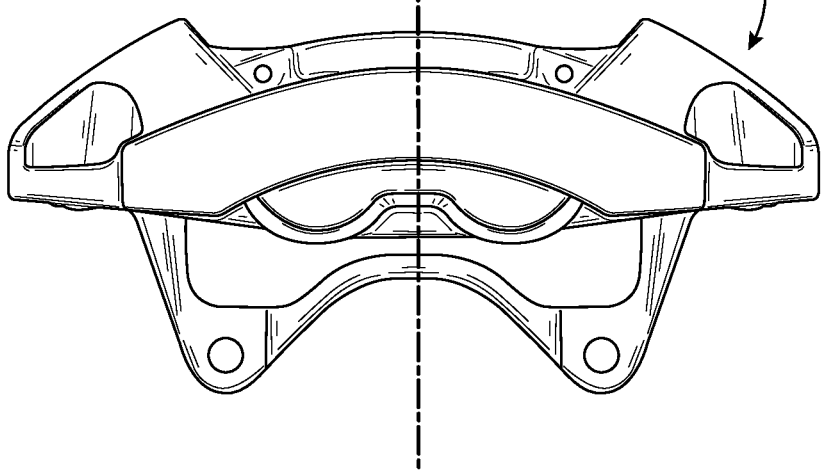
FIG. 12C is a front view of a passenger's side asymmetrical fixed caliper cover.
Figure 13A:
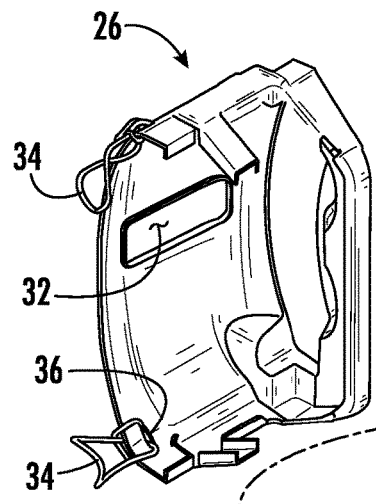
FIG. 13A is a first side, rear upper perspective view of a o-rings variation of the floating caliper cover.
Figure 13B:
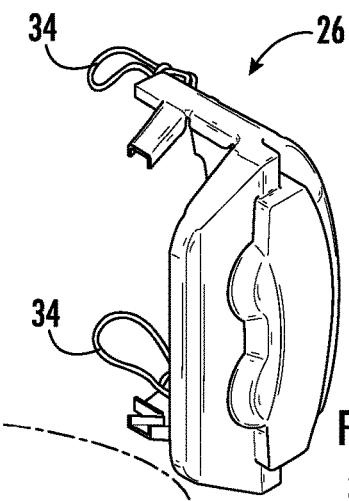
FIG. 13B is a second side, rear upper perspective view of the o-rings variation of the floating caliper cover.
Figure 13C:
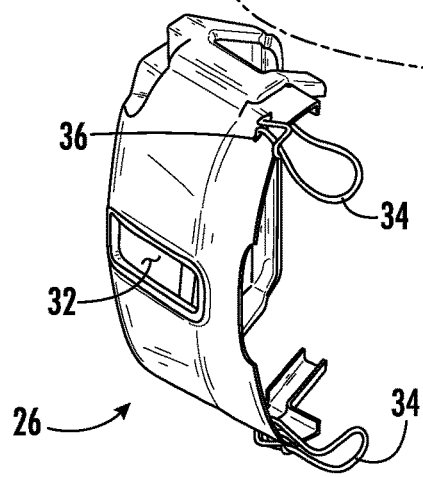
FIG. 13C is a first side, front upper perspective view of the o-rings variation of the floating caliper cover.
Figure 13D:
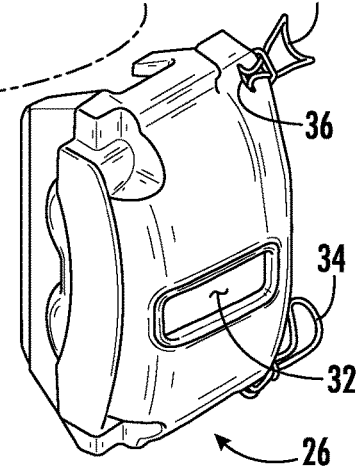
FIG. 13D is a second side, front upper perspective view of the o-rings variation of the floating caliper cover.
Figure 14A:
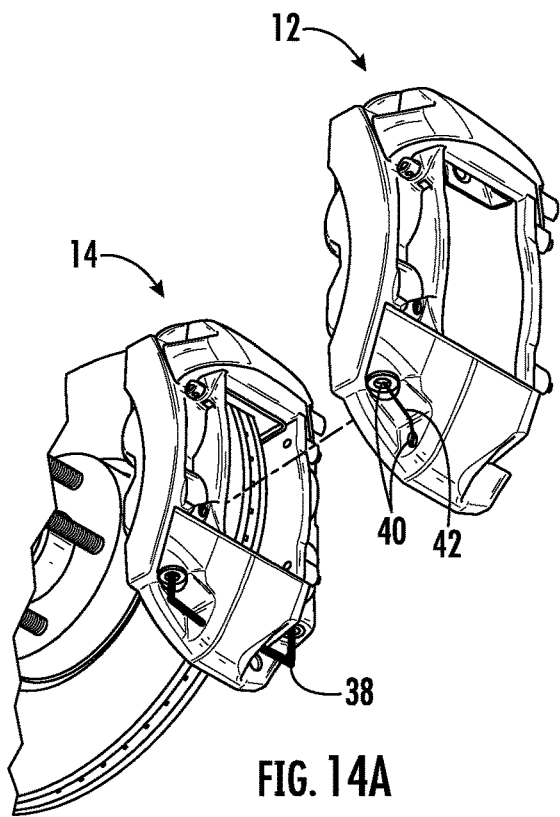
FIG. 14A is a first side, lower perspective exploded view of an alternative variation of the fixed caliper cover with corresponding automotive disc brake.
Figure 14B:
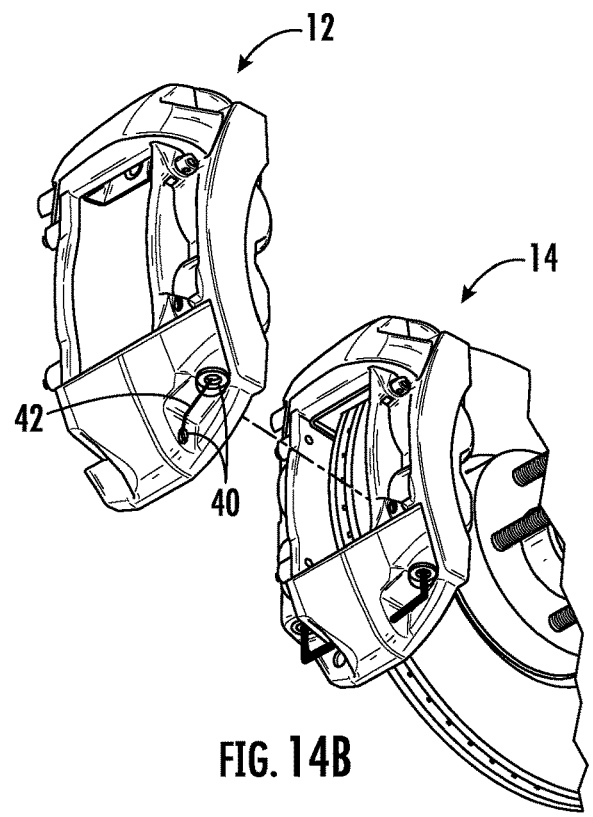
FIG. 14B is a second side, lower perspective exploded view of the fixed caliper cover and automotive disc brake of FIG. 14A.
Figure 14C:
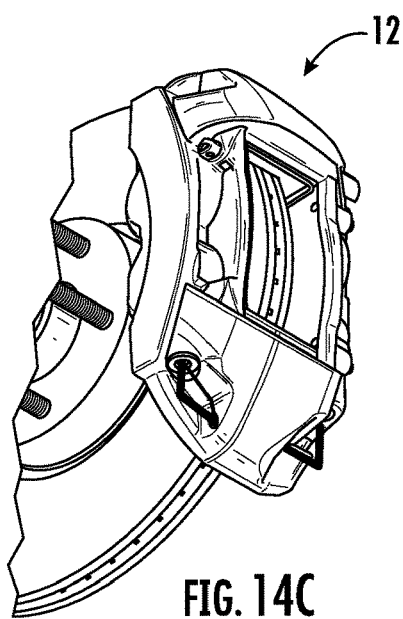
FIG. 14C is a first side, lower perspective view of the alternative variation of the fixed caliper cover installed on the corresponding automotive disc brake.
Figure 14D:
FIG. 14D is a second side, lower perspective view of the alternative variation of the fixed caliper cover installed on the automotive disc brake.

With this background in mind, the following structural variation of the fixed caliper cover 12 design of the present disclosure may achieve symmetry despite the lack of symmetry of the fixed calipers 14 from which they have been designed (FIG. 12). Regarding design process, the symmetry of this structural variation may be realized by ensuring the 3-dimensional internal surface 22 of the fixed caliper cover 12 is derived from a comparison of the various 3-dimensional external surface regions of each side of the caliper 14 as bisected by a plane across the caliper length. Using this comparison, the design of the symmetrical fixed caliper cover 12 is developed by using only the outer-most external surface of the two opposing surfaces of the fixed caliper (FIG. 12). Although this approach to the design process may result in cavities between the inside surface of the fixed caliper cover 12 and the fixed caliper 14 in some areas when installed, designing in this way affords the desired symmetry of design required to allow for a single mold to be used in the manufacture of the front pair of fixed caliper covers 12. Therefore, one mold may be capable of supporting fabrication of the two fixed caliper covers 12 of the pair. The fixed caliper 14 may also include an external surface 23 opposite the internal surface 22 to define a thickness therebetween.

One aspect of this variation of the fixed caliper cover 12, as molded, that may differ between the driver and passenger side versions is the location of the ⅜-inch diameter bleeder screw hole 18 on each. In some embodiments, the hole must be located on the opposing end for each caliper of the pair. Given this variance, the bleeder screw hole 18 is formed where needed as a post-molding, die-cutting process allowing for fabrication of the respective fixed caliper cover 12 corresponding to each side of the pair from a common mold (FIG. 12) or simply placed on both sides as an aesthetic compromise ensuring fitment to either caliper 14. Floating calipers 24, however, may be devoid of a visible bleeder screw. Thus, the same floating caliper cover 26 of the present disclosure may be used for both calipers 24 comprising the rear pair without the need to accommodate a variance of a bleeder screw location with a post-molding process.

The floating caliper cover 26 may also include a 0.050 inch silicone membrane that follows the exact contours of the outer surface of the fixed caliper for which it has been designed. As noted above, the dimensions and materials provided herein are for example, and other dimensions for the floating caliper cover 26, such as 0.015-0.150 inches, and other materials known in the art, may be used without departing from the spirit and scope of the present disclosure. The floating caliper cover 26 may also be sized and configured to cover 100% of all visible caliper surfaces once installed. As with the fixed caliper cover 12, the surfaces which are not covered by the installed floating caliper cover 26 may be limited to one or more of the non-visible surfaces on the wheel-well-facing surface of the caliper 24. By having a design that covers less than 100% of the non-visible surfaces, the floating caliper cover 26 may be made easier to install while also allowing for more effective heat dissipation of the caliper 24 via convection cooling during vehicle use/braking.

The specified material (80A durometer silicone) and the caliper/vehicle-specific design of the floating caliper cover 26 combine to allow for a form fitted interface with the floating caliper 24 of the vehicle. The hardness may vary between 60 A-100 A, similar to the fixed caliper cover 12 discussed above.

As stated previously, unlike the mono-block design of a fixed caliper 14, a floating caliper 24 incorporates a static (non-moving) caliper bracket and a dynamic (moving) caliper frame (FIG. 9). This is because the caliper bracket is mounted to the vehicle and, therefore, not moving with respect to it. The caliper frame, however, as a reaction to the piston displacement during braking, does move with respect to the vehicle. As such, the floating caliper cover 26 may be designed to cover and affix firmly to the caliper bracket while covering, but allowing movement of, the caliper frame beneath it. The design of the floating caliper cover 26 may accomplish this by engaging opposing edges of the caliper 24 and holding the caliper cover 26 in flexible tension across the face and top of the caliper 24. Specifically, the interface may be enabled by a floating caliper cover 26 design that allows for engaging opposing features so as to hold the caliper cover 26 in flexible tension across the face and top of the caliper 24.

Figure 8B:
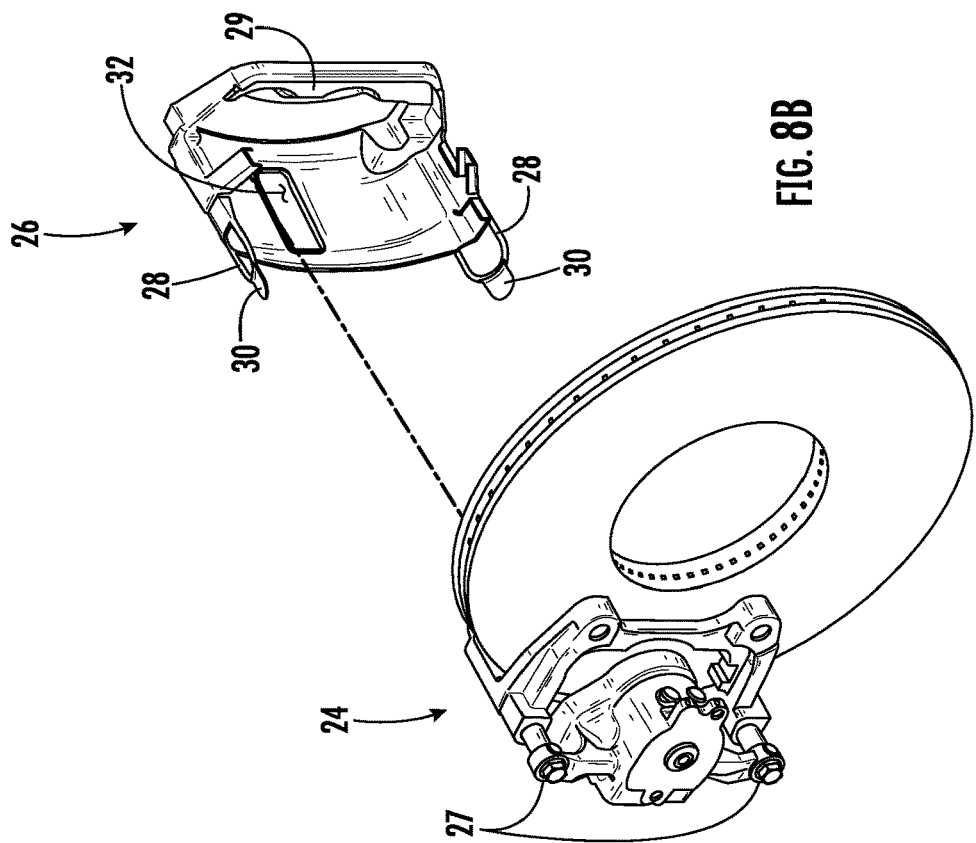
FIG. 8B is an exploded, rear upper perspective view of the floating caliper cover with floating caliper over rotor.
Figure 8A:
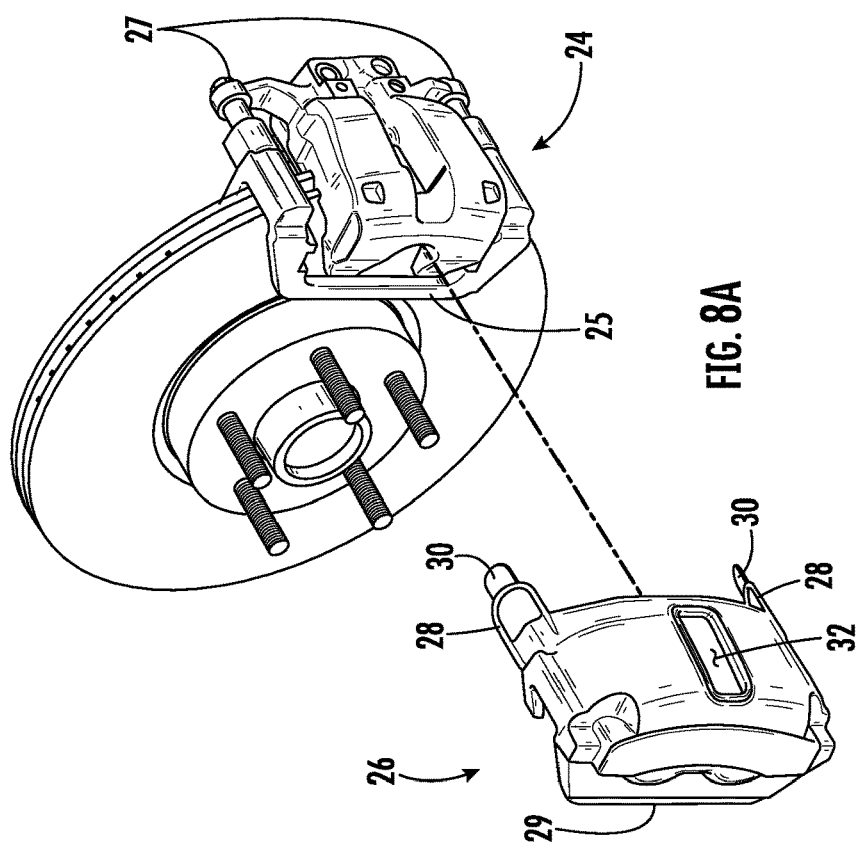
FIG. 8A is an exploded, front upper perspective view of the floating caliper cover with floating caliper over rotor.
Figure 9A:
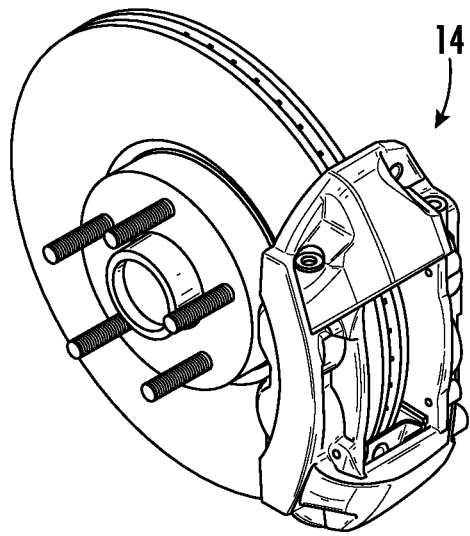
FIG. 9A is a first side upper perspective view of the fixed caliper cover mounted on the fixed caliper over rotor.
Figure 9B:
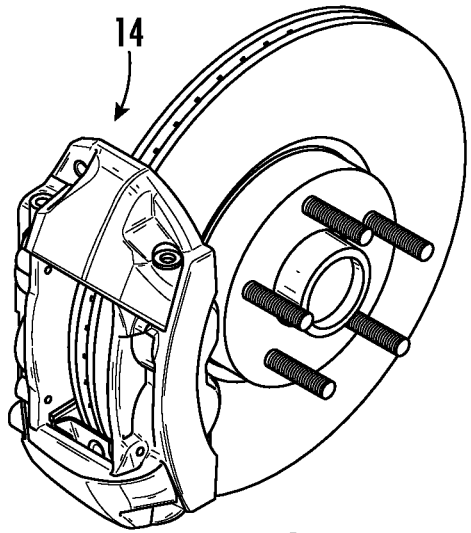
FIG. 9B is a second side upper perspective view of the fixed caliper cover mounted on the fixed caliper over rotor.
Figure 9C:
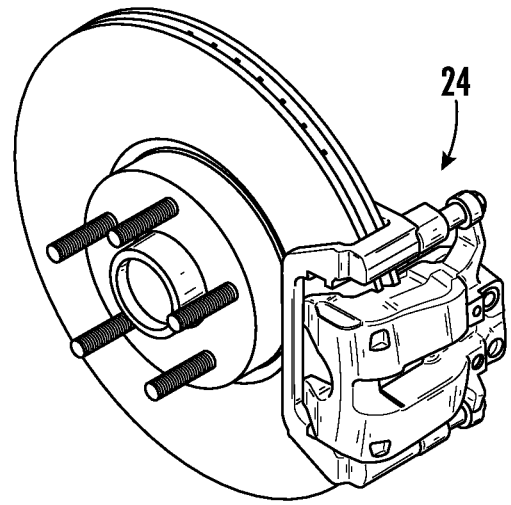
FIG. 9C is a first side upper perspective view of the floating caliper cover mounted on the floating caliper over rotor.
Figure 9D:
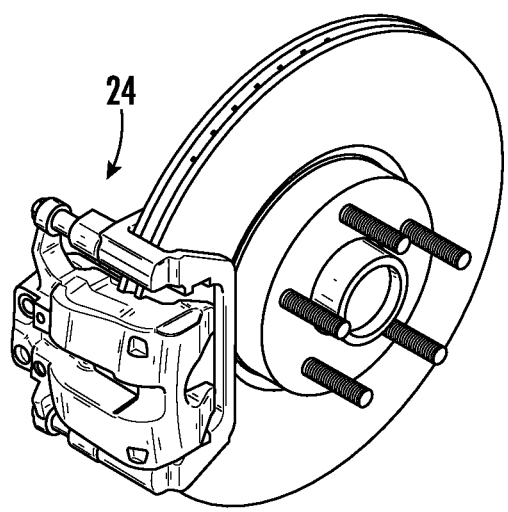
FIG. 9D is a second side upper perspective view of the floating caliper cover mounted on the floating caliper over rotor.
Figure 10A:
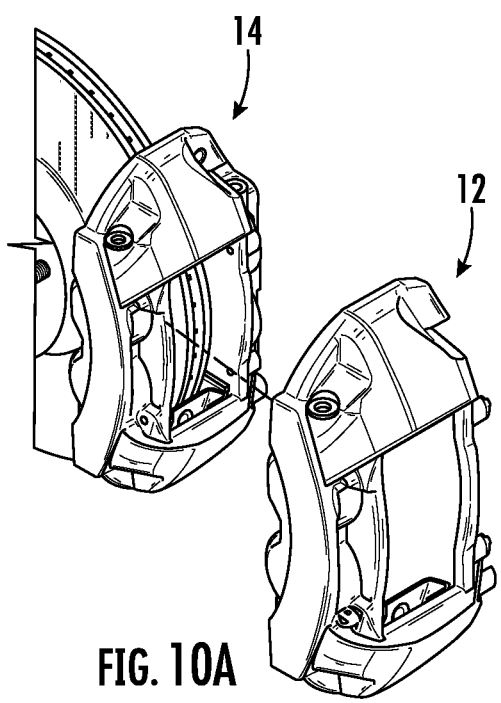
FIG. 10A is an exploded first side upper perspective view of the fixed caliper cover and the fixed caliper over rotor.
Figure 10B:
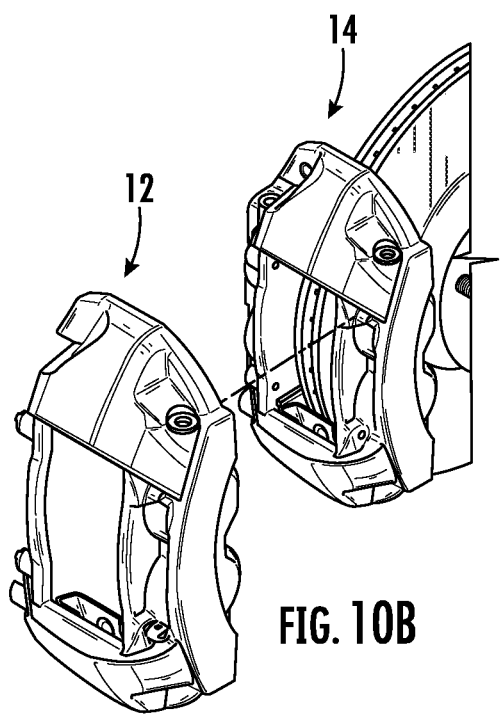
FIG. 10B is an exploded second side upper perspective view of the fixed caliper cover and the fixed caliper over rotor.
Figure 10C:
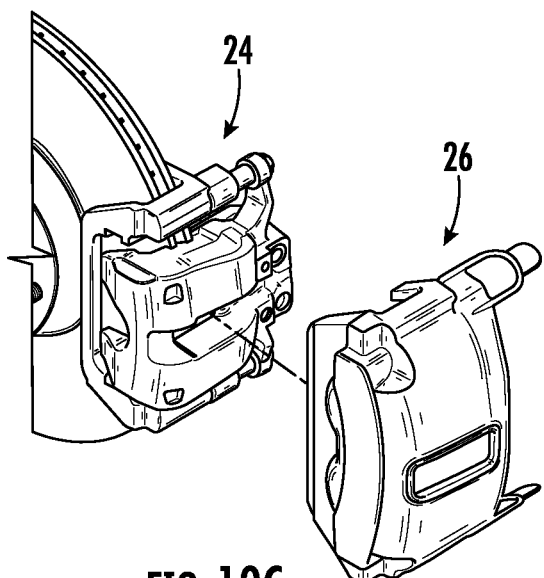
FIG. 10C is an exploded first side upper perspective view of the floating caliper cover and the floating caliper over rotor.
Figure 10D:
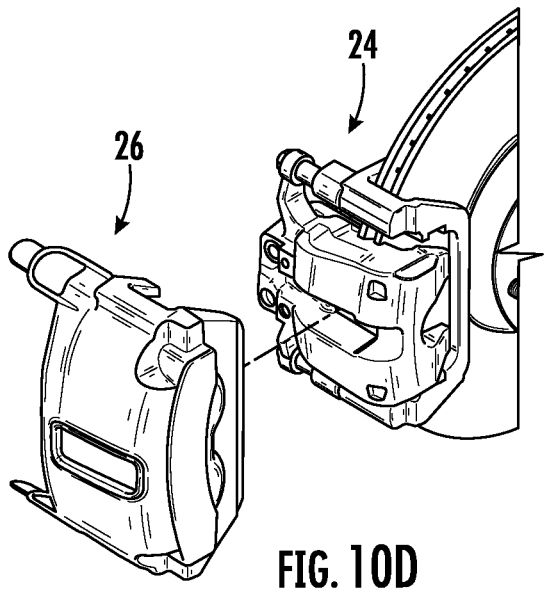
FIG. 10D is an exploded second side upper perspective view of the floating caliper cover and the floating caliper over rotor.
Figure 11A:
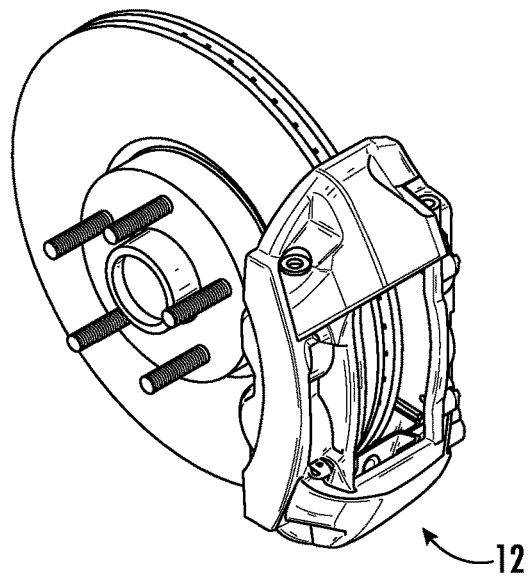
FIG. 11A is a first side, rear upper perspective view of the fixed caliper cover installed on the fixed caliper over rotor.
Figure 11B:
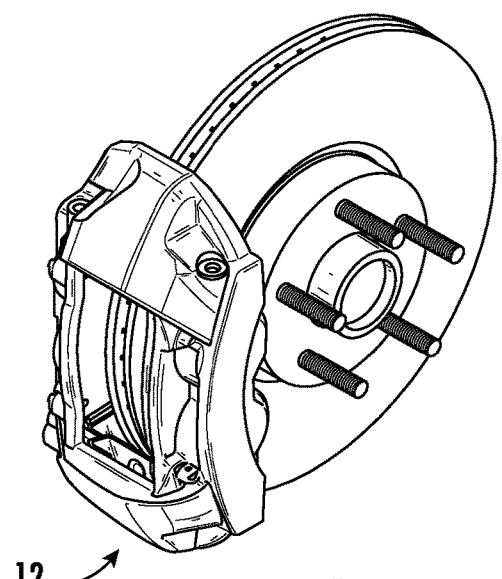
FIG. 11B is a second side upper perspective view of the fixed caliper cover installed on the fixed caliper over rotor.
Figure 11C:
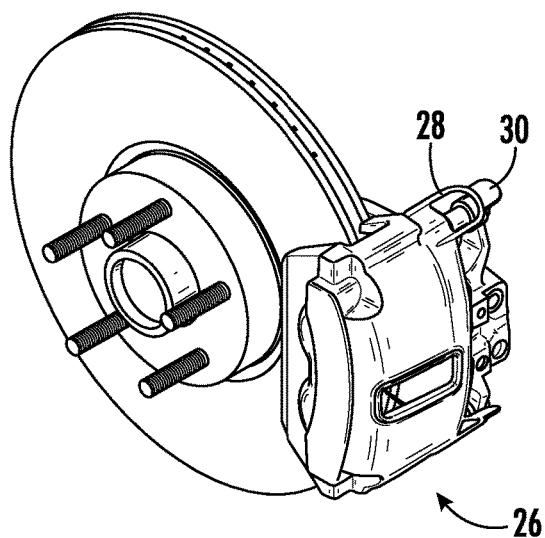
FIG. 11C is a first side upper perspective view of the floating caliper cover installed on the floating caliper over rotor.
Figure 11D:
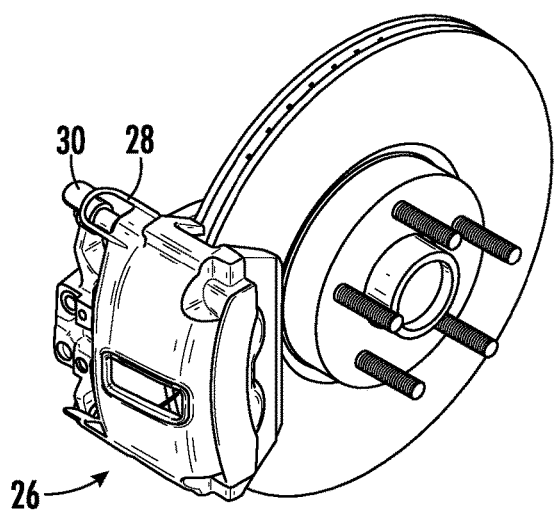
FIG. 11D is a second side upper perspective view of the floating caliper cover installed on the floating caliper over rotor.

According to one embodiment, these opposing features of engagement are: (a) the external front of the caliper 24 across the full length of the bottom edge of the caliper bracket proximate to the rotor hub, and (b) the internal top of the caliper frame at the two bolt head locations (FIG. 8). The front bottom edge engagement with the static caliper bracket may include a snap-into-position channel interface 25, while the internal top engagement with the two bolt heads 27 of the dynamic caliper frame is a multiple-elastic-loop interface. These opposing interfaces secure the caliper cover 26 across the caliper surface via a flexible tension interface. Although this type of interface is depicted on the floating rear caliper, the identical interface is possible on any floating caliper including those often positioned at the front of a vehicle.

Regarding the external front interface, the channel interface may be designed to run across the entire length of the bottom and also come upward along both sides to some extent. By having a U-shaped design to this channel interface the flexible channel 29 is far more secure than an alternative linear channel design that only runs across the bottom length of the static caliper bracket without turning up along each side (FIG. 8). Regarding the internal top elastic loop interface design, multiple elastic loops 28 engage with the bolt heads 27 that are a common characteristic of a floating caliper frame (FIG. 10). These elastic loops 28 are effectively integrated to the caliper cover 26 itself given that the material of construction of the caliper cover 26 may be a flexible material, such as silicone. Additionally, these elastic loops 28 can be designed with integral grip-tabs 30 for use by the installer to assist in stretching the loops 28 over the bolt heads 27 to secure the cover 26 to the caliper 24 (FIG. 11). Thus, for the floating caliper cover 26, the primary retention feature may involve retaining the floating caliper cover 26 in flexible tension via two opposing interfaces: (a) the leading edge caliper bracket interface across the caliper front, and (b) the multiple-elastic-loop retention feature across the internally located caliper frame bolt heads. The loops 28 may extend from a medial portion 31 of an outer surface 33 of the floating caliper cover 26. The outer surface 33 may also include a lateral portion 35 opposite the medial portion 31.

Additionally, as with the fixed caliper cover 12, the flexibility of the selected material allows the floating caliper cover 26 to flex or stretch over the geometric contours of the floating caliper 24 during installation, creating "die-lock" conditions over many of the floating caliper surfaces. These "die-lock" conditions offer supplemental securing positions in addition to the double-loop retention feature previously described.

Regarding material selection, the silicone material of the present disclosure possesses chemical and heat resistant properties so as to meet the environmental requirements of the floating caliper cover 26. Other materials known by those skilled in the art capable of withstanding the chemical and thermal environments subjected to the caliper environment may also be used.

Because the floating caliper 24 is more common to base model braking systems than the fixed caliper 14, one of the objectives of one embodiment of the floating caliper cover 26 is to create the appearance of a fixed caliper 14 when installed onto the floating caliper 24. Therefore, unlike the fixed caliper cover 12 design, which precisely follows the surface of the fixed caliper 14, the floating caliper cover 26 design may incorporate geometries similar to those of the fixed caliper cover 12 as afforded by gaps between the static caliper bracket and the dynamic caliper frame surface areas (FIG. 10). One important industrial design characteristic of a fixed caliper 14 that may be missing from the design of the floating caliper 24 is the multiple-piston-shaped surface contours across the front visible face of the fixed caliper 14. This geometry serves to provide structural support of the opposing pistons operating internal to a fixed caliper 14. The resultant surface contours present a defining design feature of a fixed caliper 14. Accordingly, the design of the floating caliper cover 26 may incorporate the multiple-piston-shaped surface contours feature of the fixed caliper 14 even though the floating caliper 24, itself, does not. In addition to this design feature, the floating caliper cover 26 similarly incorporates a visible rectangular opening 32 across the top surface. This opening 32 replicates a key design element characteristic of a fixed caliper 12 while also providing a vent for caliper cooling during braking. Any variations made to improve the design aesthetic of the floating caliper may be constrained by the rotating wheel proximate to the caliper per the vehicle design. Accordingly, in accordance with one embodiment of the present disclosure, so as to avoid interference during vehicle operation, no variation incorporates design elements that protrude off the front surface of the floating caliper closely facing the inside of the wheel. The preferred embodiment of the floating caliper cover 26 of the present disclosure is symmetrical. A single version of the floating caliper cover 26 may work for both the driver and passenger side floating calipers because they are identical. A variation to the preferred embodiment of the floating caliper cover 26 of the present disclosure is one that works for a floating caliper design that is not symmetrical. Such a functional variation would employ the same principles as outlined in the fixed caliper variation for use with an asymmetrical caliper pair (FIG. 12).

The preferred embodiment of the floating caliper cover 26 of the present disclosure also incorporates a design that engages the leading edge of the caliper bracket on the front of the caliper 24 while incorporating a double-loop retention feature engaged in two positions on the opposing internal side of the caliper 24. This double loop retaining feature is integral to the caliper cover 26 itself and stretches over and engages with each of the twin bolt heads of the dynamic caliper frame upon installation (FIG. 11). A variation to the preferred embodiment of the floating caliper cover 26 of the present disclosure is one that achieves the same functionality of the integral elastic loop retention feature by using separate o-rings 34 instead of integral loops 28 (FIG. 13). Such a variation to the design would function by having the o-rings 34 interface with holes 36 integral to the caliper cover 26 at positions proximate to the integral loops of the preferred embodiment. Once looped into the holes 36 and integrated to the caliper cover 26, the o-rings 34 can each then be stretched over the respective bolt heads themselves to complete the caliper cover installation. Additionally, using separate o-rings 34 affords a design having a different durometer for the o-rings 34 (i.e., softer and more flexible) than the caliper cover 26 as a whole. Thus, while the preferred embodiment incorporates integrated loops 28 to affect the functionality of the double-loop retention feature, a structural variation of this feature as described herein incorporates twin holes 36 with the use of two separate o-rings 34 looped through the holes 36 and around the bolt heads along the internal side of the caliper frame during installation.

Each caliper cover 12, 26 may be designed as a one piece cover that interfaces only with its specific caliper 14, 24. Therefore, the vehicle specific caliper design dictates the caliper cover design. A fixed caliper cover design differs from a floating caliper cover design based on the differences between the two types of calipers 14, 24 as previously illustrated within the diagrams (FIG. 10, et al.). As a single component, each caliper cover 12, 26 may have no other interconnecting components other than as described by the functional variation of the floating caliper cover 26 having separate o-rings 34 instead of integral elastic loops 28.

As described in the preferred embodiment of the present disclosure, a hole 18 may be incorporated into the fixed caliper cover 12 to allow for the bleeder screw fitting to pass through the surface of the fixed caliper cover 12 during installation over the caliper 14, thereby making the bleeder screw fitting of the caliper 14 a visible feature to the present disclosure as installed (FIG. 10). Similarly, an alternative variation of the present disclosure incorporates a different type of opening into the cover design to ensure visibility of a different feature for a variant to the fixed caliper design of the present disclosure. Specifically, unlike the fixed caliper of the present disclosure which has one visible bleeder screw fitting (two total) ported to only the upper end of the caliper, many fixed caliper designs have a tubing assembly 38 ported via identically sized fittings to the opposing end of the caliper, as well (FIG. 14). Such a fixed caliper design uses an external tubing assembly 38 to allow for the caliper itself (i.e., less the tubing assembly and bleeder screw fittings) to be symmetrical, thus eliminating the need for two forgings to fabricate both a driver and a passenger side version. That is, with respect to manufacture of the fixed calipers themselves, driver side caliper vs. passenger side caliper is realized depending on which end of the forged/machined caliper receives the bleeder screws or the tubing assembly during the post-forging/machining assembly process. Given this fixed caliper design variation, an alternative fixed caliper cover 12 variation of the present disclosure is one that accommodates this difference by means of two additional holes 40, one for each visible fitting of the tubing assembly 38, and a slit 42 between these two holes 40 for the tubing itself. Each opening of this variation allows each caliper feature to become visible as it passes through the wall of the fixed caliper cover 12 during installation (FIG. 14). Further, given the mold consolidation opportunity afforded by the symmetry of the fixed caliper 14 that uses a tubing assembly 38, the holes 40 and the slits 42 on the fixed caliper cover 12 are executed via a post-mold punch-out process, thus eliminating the need for two fixed caliper cover molds. The elements of both this design variation (3 holes and a slit between two of them) and that of the fixed caliper cover 12 of the present disclosure (one hole) may be incorporated into their respective versions of the single component silicone fixed caliper cover 12 to allow for the respective design feature of the fixed caliper 14 to pass through the fixed caliper cover 12 during installation. How this is done with respect to symmetry, as outlined above, affords cost saving opportunities with respect to mold consolidation as symmetry allows for a single cavity mold.

Figure 15A:
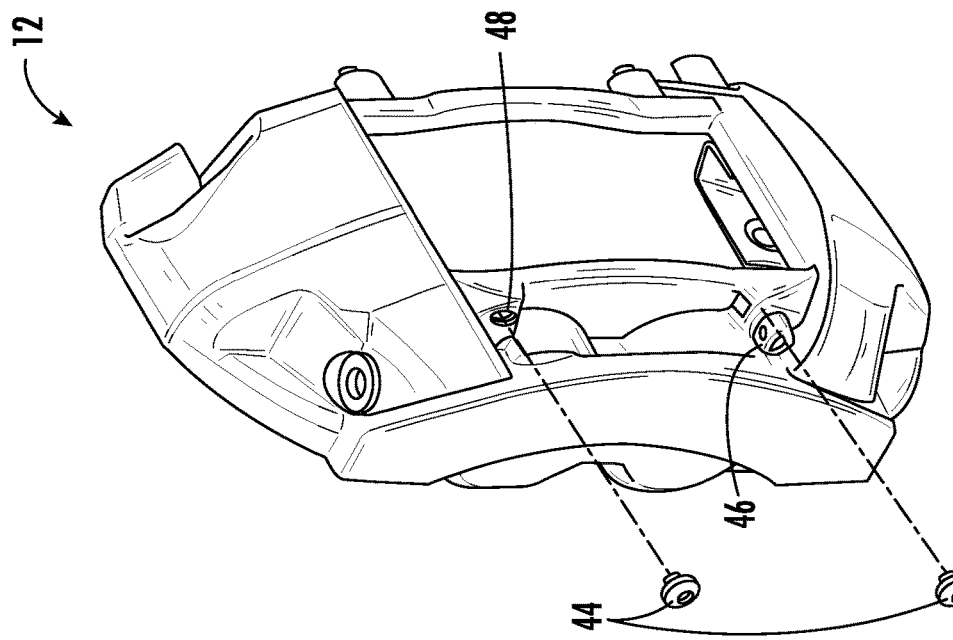
FIG. 15A is an exploded upper perspective view of an alternative variation of the fixed caliper cover (driver side)
Figure 15B:
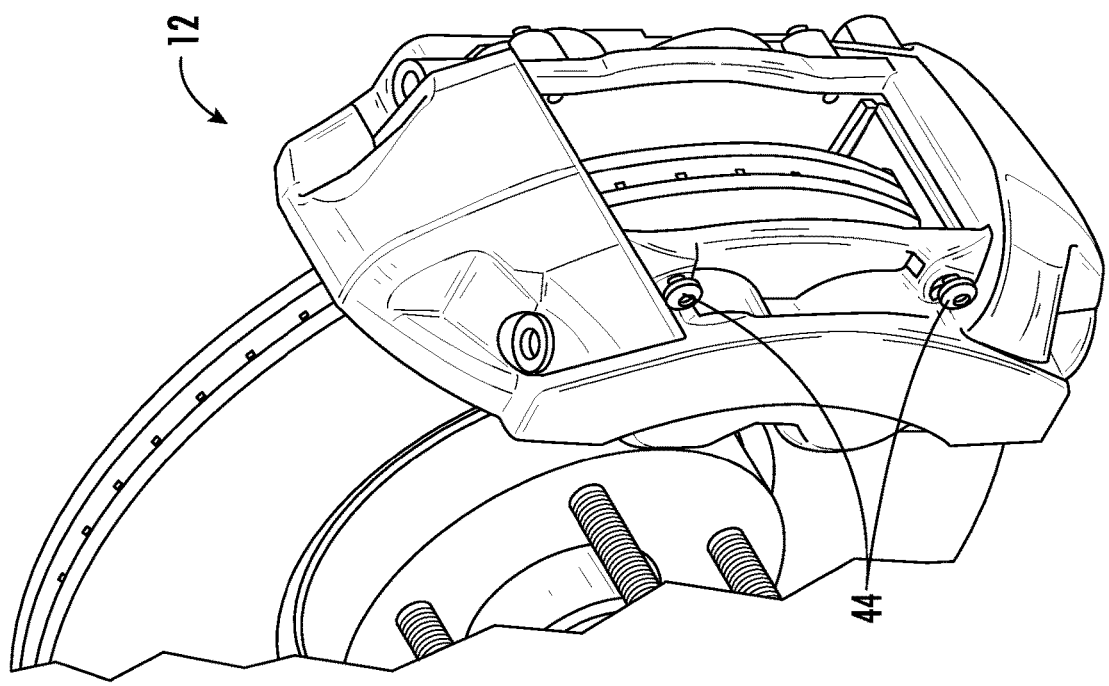
FIG. 15B is an upper perspective, installed view of an alternative variation of the fixed caliper cover (driver side).

An alternative method of making visible a design feature missing from the caliper design, or one otherwise hidden by the caliper cover, is to represent the missing or hidden feature on the outside of the caliper cover by the integration of one or more additional components designed to look like the missing or hidden feature. An example of an otherwise hidden design feature would be the socket head caps of the socket head cap screws visible on the outer surface of a typical fixed caliper design (FIG. 15). These socket head cap screws may work in tandem on each fixed caliper 14 to hold the brake pads and pad clips in place. They are especially visible on OEM painted fixed calipers 14 because these calipers are painted prior to assembly of the caliper's internal components as adjoined by the socket head cap screws (silver in appearance). Despite these socket head caps being visible on some fixed caliper designs, others, including that of the present disclosure, do not have visible socket head caps. In these cases, a variation to the single-component design of the silicone fixed caliper cover 12 is one that incorporates decorative caps 44 as additional components to create the appearance of the socket head caps on its surface. Thus, an alternative variation of the single component design is one that incorporates barbed or threaded nipples 46 projecting from the single component cover 12 at the proximate locations of each socket head cap. Interfacing with these barbed or threaded nipple projections 46 are the decorative caps 44, each designed to have the appearance of the normally visible socket head cap on one side and a female thread internal to the other. The decorative cap 44 may be affixed to the silicone cover detail via either a press fit over the barbed nipple version or a threaded interface over the threaded nipple version. The interface of either variant could be supplemented with the use of adhesive as an option. Alternatively, instead of a protruding feature on the silicone cover at the socket head cap locations, round or slotted holes 48 punched through the silicone cover 12 at these locations affords an alternative interface. These holes, combined with a version of the decorative socket head caps 44 incorporating a securing flange detail, allow for a shirt-to-button type interface (FIG. 15). Either of these options for affixing the decorative socket head cap feature can be realized during either the manufacturing process by the manufacturer or during installation by the installer.

Yet a third option for interfacing the decorative socket head caps with the silicone fixed caliper cover 12 is to have the flange version of the decorative caps 44 insert molded into the silicone cover 12 itself. Additionally, a variation of the floating caliper cover 26 of the present disclosure is one that similarly incorporates add-on components such as decorative socket head caps 44. The same concept using the same methods for attachment can be used for a variation of the floating caliper cover 26 as previously described for the fixed caliper cover 12 variation. When used with either the fixed or floating caliper cover 12, 26, these add-on components create the appearance of a specific feature to enhance the authenticity of the present disclosure in its purpose of replicating the appearance of a factory-painted premium fixed caliper. The material specified for the decorative socket head caps for any variation described above is chrome-plated ABS or similar plastic if molded and chrome-plated steel, stainless steel, aluminum or other rust resistant alloy of similar color if machined from bar stock.

The present disclosure may be adaptable for use with automotive disc brake systems comprised of a combination of both fixed and floating caliper types (FIG. 9). Regardless of caliper type, the material of construction and the design elements of the caliper cover allow it to flex over the retaining edges of the caliper and then to retract to its original form, thus firmly affixing itself over the securing surfaces of the caliper (FIG. 11) as installed.

Additionally, the floating caliper cover 26 interface may involve engaging opposing features and holding the caliper cover 26 in flexible tension across the face and top of the caliper 24. These opposing features of engagement are: (a) the external front of the caliper across the full length of the bottom edge of the caliper bracket proximate to the rotor hub, and (b) the internal top of the caliper frame at the two bolt head locations. The front bottom edge engagement with the static caliper bracket is a snap-into-position channel interface while the internal top engagement with the two bolt heads of the dynamic caliper frame is a multiple-elastic-loop interface. These opposing interfaces secure the caliper cover across the caliper surface via a flexible tension interface. Once installed, each caliper cover 12, 26 of the present disclosure, whether fixed or a floating, remains completely static and secure to its mating caliper 14, 24 (FIG. 11). Although having much more detail with respect to industrial design and a far different application of use, each silicone caliper cover 12, 26 from which the present disclosure is comprised may function in a way that is analogous to that of a silicone smart phone case. Each is designed to be flexible against the forces to which it is exposed during installation while having a shape allowing it to snugly retract against the securing surfaces of the object to which it has been designed to partially cover.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A vehicle caliper cover set for use with a caliper disc brake system on a vehicle including a pair of fixed calipers and a pair of floating calipers, the vehicle caliper cover set comprising:
- a pair of fixed caliper covers, each fixed caliper cover including:
  - an inner surface sized and configured to be complementary in shape to an outer surface of one of the pair of fixed calipers;
  - an outer surface having a medial portion and a lateral portion, the medial and lateral portions being on opposite sides of the outer surface, the inner and outer surfaces defining a thickness therebetween, the thickness being between 0.015-0.150 inches; and
  - a multi-sided opening extending from the inner surface to the outer surface, the multi-sided opening being positioned between the medial and lateral portions of the outer surface;
- a pair of floating caliper covers, each floating caliper cover including:
  - an inner surface sized and configured to be complementary in shape to an outer surface of one of the pair of floating calipers;
  - an outer surface having a medial portion and a lateral portion, the medial and lateral portions being on opposite sides of the outer surface, the inner and outer surfaces defining a thickness therebetween, the thickness being between 0.015-0.150 inches; and
  - a pair of loops extending from the medial portion of the outer surface, each of the pair of loops being extendable around a respective portion of one of the pair of floating calipers.

2. The vehicle caliper cover set recited in claim 1, wherein each fixed caliper cover includes a hole sized to receive a bleeder screw on a respective one of the pair of fixed calipers.

3. The vehicle caliper cover set recited in claim 1, wherein the pair of fixed caliper covers and the pair of floating caliper covers are fabricated from a material having a shore hardness in the range of 60 A-100 A.

4. The vehicle caliper cover set recited in claim 1, wherein the pair of fixed caliper covers and the pair of floating caliper covers are fabricated from a silicone material.

5. The vehicle caliper cover set recited in claim 1, wherein each of the pair of fixed caliper covers and each of the pair of floating caliper covers are flexible and disposable in tension.

6. The vehicle caliper cover set recited in claim 1, wherein each of the pair of fixed caliper covers and each of the pair of floating caliper covers are extendable between a neutral configuration and a flexed configuration, an internal biasing force within each of the pair of fixed caliper covers and the pair of floating caliper covers increases as each cover is transitioned from the neutral configuration toward the flexed configuration, each of the pair of fixed caliper covers and each of the pair of floating caliper covers being biased toward the neutral configuration.

7. The vehicle caliper cover set recited in claim 1, wherein each of the pair of fixed caliper covers and each of the pair of floating caliper covers are formed of respective unitary bodies.

8. The vehicle caliper cover set recited in claim 1, wherein each of the pair of floating caliper covers includes a main body and a pair of o-rings connected to the main body, the pair of o-rings defining the pair of loops.

9. A vehicle caliper cover set for use with a caliper disc brake system on a vehicle including a pair of fixed calipers and a pair of floating calipers, the vehicle caliper cover set comprising:
- a pair of fixed caliper covers, each fixed caliper cover including:
  - an inner surface sized and configured to be complementary in shape to an outer surface of one of the pair of fixed calipers;
  - an outer surface having a medial portion and a lateral portion, the medial and lateral portions being on opposite sides of the outer surface;
  - a multi-sided opening extending from the inner surface to the outer surface, the multi-sided opening being positioned between the medial and lateral portions of the outer surface; and
  - a hole sized to receive a bleeder screw on a respective one of the pair of fixed calipers;
- a pair of floating caliper covers, each floating caliper cover including:
  - an inner surface sized and configured to be complementary in shape to an outer surface of one of the pair of floating calipers;
  - an outer surface having a medial portion and a lateral portion, the medial and lateral portions being on opposite sides of the outer surface; and
  - a pair of loops extending from the medial portion of the outer surface, each of the pair of loops being extendable around a respective portion of one of the pair of floating calipers.

10. The vehicle caliper cover set recited in claim 9, wherein the pair of fixed caliper covers and the pair of floating caliper covers are fabricated from a material having a shore hardness in the range of 60 A-100 A.

11. The vehicle caliper cover set recited in claim 9, wherein the pair of fixed caliper covers and the pair of floating caliper covers are fabricated from a silicone material.

12. The vehicle caliper cover set recited in claim 9, wherein each of the pair of fixed caliper covers and each of the pair of floating caliper covers are flexible and disposable in tension.

13. The vehicle caliper cover set recited in claim 9, wherein each of the pair of fixed caliper covers and each of the pair of floating caliper covers are extendable between a neutral configuration and a flexed configuration, an internal biasing force within each of the pair of fixed caliper covers and the pair of floating caliper covers increases as each cover is transitioned from the neutral configuration toward the flexed configuration, each of the pair of fixed caliper covers and each of the pair of floating caliper covers being biased toward the neutral configuration.

14. The vehicle caliper cover set recited in claim 9, wherein each of the pair of fixed caliper covers and each of the pair of floating caliper covers are formed of respective unitary bodies.

15. The vehicle caliper cover set recited in claim 9, wherein each of the pair of floating caliper covers includes a main body and a pair of o-rings connected to the main body, the pair of o-rings defining the pair of loops.

16. A vehicle caliper cover set for use with a caliper disc brake system on a vehicle including a plurality of calipers, the vehicle caliper cover set comprising:
- a plurality of caliper covers, each caliper cover including:
  - an inner surface sized and configured to be complementary in shape to an outer surface of one of the plurality of calipers;
  - an outer surface having a medial portion and a lateral portion, the medial and lateral portions being on opposite sides of the outer surface, the inner and outer surfaces defining a thickness therebetween, the thickness being between 0.015-0.150 inches; and
  - a multi-sided opening extending from the inner surface to the outer surface, the multi-sided opening being positioned between the medial and lateral portions of the outer surface;
- at least one of the plurality of caliper covers including a loop configured to be extendable around a respective portion of one of the calipers.

17. The vehicle caliper cover set recited in claim 16, wherein the plurality of caliper covers are fabricated from a material having a shore hardness in the range of 60 A-100 A.

18. The vehicle caliper cover set recited in claim 16, wherein each of the plurality of caliper covers are flexible and disposable in tension.

19. The vehicle caliper cover set recited in claim 16, wherein each of the plurality of caliper covers are extendable between a neutral configuration and a flexed configuration, an internal biasing force within each of the pair of fixed caliper covers and the pair of floating caliper covers increases as each cover is transitioned from the neutral configuration toward the flexed configuration, each of the plurality of caliper covers being biased toward the neutral configuration.

20. The vehicle caliper cover set recited in claim 16, wherein each of the plurality of caliper covers are formed of respective unitary bodies.

* * * * *